United States Patent
Calo et al.

(10) Patent No.: US 9,014,161 B2
(45) Date of Patent: Apr. 21, 2015

(54) MULTI-TIER INDEXING METHODOLOGY FOR SCALABLE MOBILE DEVICE DATA COLLECTION

(71) Applicant: International Business Machines Corporation, Armonk, NY (US)

(72) Inventors: Seraphin Bernard Calo, Cortlandt Manor, NY (US); Raheleh B Dilmaghani, Elsmford, NY (US); Douglas M Freimuth, New York, NY (US); Raghu Kiran Ganti, Elmsford, NY (US); Fan Ye, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 13/669,335

(22) Filed: Nov. 5, 2012

(65) Prior Publication Data
US 2014/0099938 A1    Apr. 10, 2014

Related U.S. Application Data

(63) Continuation of application No. 13/646,611, filed on Oct. 5, 2012.

(51) Int. Cl.
*H04W 4/00* (2009.01)
*G06F 17/30* (2006.01)
*H04W 4/20* (2009.01)
*H04W 24/10* (2009.01)
*H04W 8/02* (2009.01)
*H04W 4/02* (2009.01)

(52) U.S. Cl.
CPC ........... *G06F 17/30327* (2013.01); *H04W 4/20* (2013.01); *H04W 24/10* (2013.01); *H04W 4/02* (2013.01); *H04W 8/02* (2013.01)

(58) Field of Classification Search
CPC ...... H04W 80/04; H04W 84/18; H04W 84/12
See application file for complete search history.

(56) References Cited

U.S. PATENT DOCUMENTS

| 5,333,178 | A | 7/1994 | Norell |
| 2005/0149557 | A1 | 7/2005 | Moriya et al. |
| 2006/0111126 | A1* | 5/2006 | Chithambaram ......... 455/456.5 |
| 2008/0027985 | A1 | 1/2008 | Kasperkiewicz et al. |
| 2008/0320036 | A1 | 12/2008 | Winter |

(Continued)

OTHER PUBLICATIONS

A. Guttman, "R-Trees: A Dynamic Index Structure for Spatial Searching", In Proceedings of ACM SIGMOD, 1984.

(Continued)

*Primary Examiner* — Andrew Lai
*Assistant Examiner* — Jamaal Henson
(74) *Attorney, Agent, or Firm* — August Law, LLC; George A. Willinghan, III

(57) ABSTRACT

A mobile device indexing system includes a plurality of edge nodes in communication with each other across a communication network and a plurality of mobile devices configured to communicate with the edge nodes. Each mobile device has both computing and communication functionalities. A separate mobile device index is maintained at each one of the plurality of edge nodes. Each mobile device index is a geographical spatio-temporal index having entries for a unique set of mobile devices derived from the plurality of mobile devices. Each unique set contains only mobile devices registered to the edge node associated with that mobile device index.

10 Claims, 3 Drawing Sheets

(56) References Cited

U.S. PATENT DOCUMENTS

| | | | |
|---|---|---|---|
| 2009/0036111 A1 | 2/2009 | Danford et al. | |
| 2010/0002665 A1 | 1/2010 | Oguchi | |
| 2010/0087188 A1 | 4/2010 | Griff et al. | |
| 2010/0094930 A1 | 4/2010 | Griff et al. | |
| 2010/0232330 A1 | 9/2010 | Cheng et al. | |
| 2011/0035401 A1* | 2/2011 | Nye | 707/769 |
| 2012/0106416 A1 | 5/2012 | Zheng et al. | |
| 2013/0195032 A1* | 8/2013 | Goransson et al. | 370/329 |
| 2014/0099938 A1 | 4/2014 | Calo et al. | |

OTHER PUBLICATIONS

Anonymous, "Improving Index Search Performance by Creating Temporary Sub Indexes Based on Query Metadata", ip,.com, Jun. 7, 2010.

Shneiderman, Ben, "Reduced Combined Indexes for Efficient Multiple Attrobute Retrieval", ip.com, Jun. 30, 1976.

Yanif Ahmad and Suman Nath, "COLR-Tree: Communication-Efficient Spatio-Temporal Indexing for a Sensor Data Web Portal", in ICDE, 2008, pp. 784-793.

* cited by examiner

MULTI-TIER INDEXING METHODOLOGY FOR SCALABLE MOBILE DEVICE DATA COLLECTION

CROSS-REFERENCE TO RELATED APPLICATIONS

The present application is a continuation of co-pending U.S. patent application Ser. No. 13/646,611 filed Oct. 5, 2012. The entire disclosure of that application is incorporated herein by reference.

STATEMENT REGARDING FEDERALLY SPONSORED RESEARCH

The invention disclosed herein was made with U.S. Government support under Contract No. W911NF-06-3-0001 awarded by the U.S. Army. The Government has certain rights in this invention.

FIELD OF THE INVENTION

The present invention relates to mobile devices, indexing and data collection.

BACKGROUND OF THE INVENTION

Communication networks including wide area networks and cellular telephone networks include numerous devices such as mobile communication and computing devices that contain data collection functionalities such as positioning information obtained from global position systems, audio data, video data, meteorological data and proximity detection data for other objects in proximity to a given mobile device. In order to effectively collect data from multiple devices changing their physical location and therefore their registration with base stations and nodes within the communication network, an accurate index of the current location and data generation capabilities of each mobile device is required. Suitable indexing systems accommodate the physical movement of the mobile devices and the changing registration of the mobile devices within the communication network.

As the number of mobile devices can be large and can grow rapidly, the index structure has to scale to support efficient data collection from the multitude of mobile wireless devices. In current mobile computing networks, the indexing structure is generally centralized, and the base stations in these networks function only a frequency and channel allocation entities. One current system uses a spatio-temporal extension of an R-tree index that is maintained in a large central database. Data collection from selected mobile devices based on queries from a central entity in this system is inefficient as it requires centralized processing and back and forth communications between the mobile station controller and the mobile devices.

SUMMARY OF THE INVENTION

Exemplary embodiments of systems and methods in accordance with the present invention provide multi-tiered mobile device indexing that uses peer-to-peer (P2P) scaling mechanisms at the edge node level combined with spatio-temporal R-trees between mobile devices and edge nodes to achieve efficiency through intelligence at the edge node level of the communication network. This provides for more efficient query processing and data collection from the mobile devices and supports index scaling to millions of mobile devices.

A given query is received in the backend of the communication network, for example at a root node. If possible, the received query is broken down into a plurality of sub-queries using, for example, a "decomposition" algorithm. An index, e.g., a multi-dimensional R-tree index, is maintained at the backend. This root node index efficiently indexes the data collection capabilities of the edge nodes of the communication network based on the registered mobile devices. The broken down queries, or the entire query if the query is not decomposed, are directed to the appropriate edge nodes based on the type of data requested and the maintained index. The edge node index is updated based on reports from the edge nodes regarding the registered mobile devices and the associated geographic coverage area, which are dynamic and change over time. The edge nodes are preferably base stations in the communication network, and the indexes maintained at each edge node are spatio-temporal R-tree based indexes based on geographic coordinates based, for example, on spherical coordinates or polar coordinates. Therefore, the present invention facilitates geographical scaling. The hierarchical structure of the present invention with multi level indexing enables scalability to hundreds of millions of mobile devices.

A peer-to-peer (P2P) indexing mechanism is used among the plurality of edge nodes in the communication network. This P2P indexing mechanism provides efficient communication between edge nodes. Each edge node is associated with a given set of mobile devices or mobile nodes. This association is based on physical proximity and is periodically refreshed based on a registration algorithm and a heartbeat listener. The heartbeats are generated by the mobile devices. If the requested data can be obtained from the mobile devices currently registered with the edge node to which the query is communicated, the edge node directly contacts the appropriate mobile devices and obtains the responsive data. If the requested data cannot be obtained, for example, because the appropriate device is missing device or in an unavailable operational state, a neighboring edge node is identified using the P2P indexing mechanism, and the data requested is transferred or handed off to this neighboring edge node.

The edge nodes contact each other to update their geographical coverage dynamically and continuously based on the associated registered mobile devices. An R-tree spatio-temporal index is maintained at each edge node. This index accounts for the location of a given device over time within a geographical space. All mobile devices associated with a given edge node, and only those mobile devices associated with that edge node, are maintained in the index. Mobile devices may be added to and removed from a given index based on the physical movement of the mobile device with respect to the edge nodes. Each mobile device registers with the geographically or physically nearest edge node, which can be determined by contacting a server. As a given mobile device moves around in a given space, that mobile device changes association with a given edge node if it moves out of coverage area, as determined, for example, by not receiving a response to heartbeat message or ping. Alternatively, the association with a given edge node can be changed in response to an explicit handoff message from the edge node. Each mobile device also sends updates to its associated edge node that gives its current location and operational state. This information is used for determining the appropriateness of the data being generated and forwarded by the mobile device.

DETAILED DESCRIPTION

Figure 1:
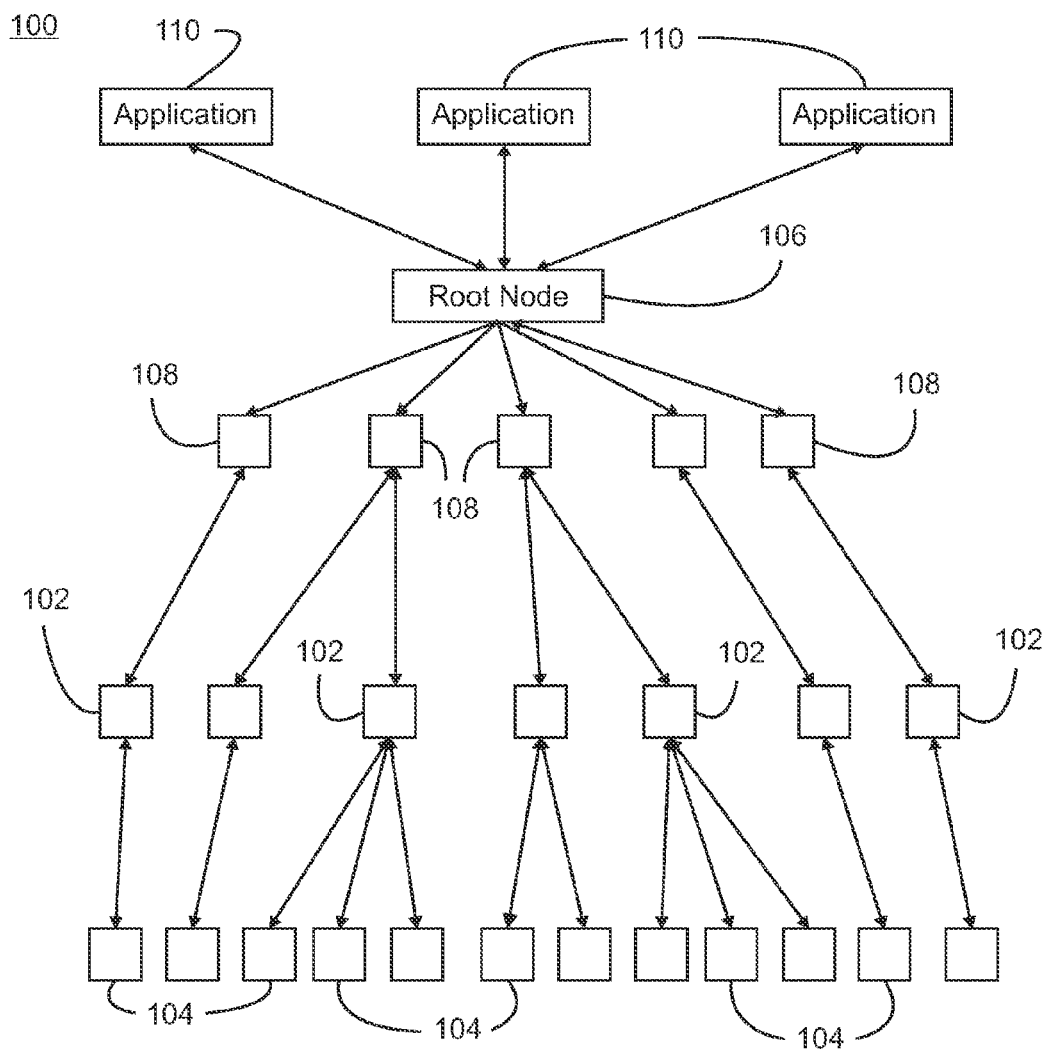
FIG. 1 is a schematic representation of an embodiment of a mobile device indexing system in accordance with the present invention.

Referring initially to FIG. 1, an exemplary embodiment of a mobile device indexing system 100 in accordance with the present invention is illustrated. In general, the mobile device indexing system includes a plurality of nodes in communication with each other across one or more local or wide area networks. Suitable networks include any type of computer network that can communicate data that is collected or generated by one or more devices from leaf nodes up through intermediate nodes to one or more roots nodes. In one embodiment, the communication network is as cellular telephone network. In one embodiment, the nodes are organized in a hierarchy, for example, a tree-type hierarchy, from one or more roots nodes 106 through intermediate nodes 108 to a plurality of leaf nodes, i.e., the edge nodes 102. Preferably, these edge nodes are base stations in a cellular telephone network.

The communication network includes a plurality of mobile devices 104 that utilize the communication network and communicate with the edge nodes, which are the point of entry or attachment to the communication network. In general, each mobile device has sufficient computing and communication functionality to communicate with the edge nodes and to handle other processing and data collection functions. Therefore, the mobile devices gather data and can communicate these data to the edges nodes either continuously or in response to a query or interrogation from the edge nodes. In addition, the mobile devices are capable of physical movement with respect to the physical location of the edge nodes. The data collected by a given mobile device correspond to the current physical location or path of travel of that mobile device at a given time or over a given time period. Therefore, data generated and collected by the mobile devices include both a temporal and a spatial component. The spatial component corresponds to a geographic location of the mobile devices. The geographic location is expressed by suitable coordinates including, for example, spherical coordinates or polar coordinates. Suitable mobile devices include, but are not limited to, computing systems such as desktop computers, laptop computers, tablet computers and servers, cellular telephones or any cellular communication enabled device including smartphones, audio surveillance systems, video surveillance systems including security camera systems and traffic monitoring systems, radar systems, weather monitoring systems, radio frequency identification systems, global positioning systems and combinations thereof.

Each mobile device 104 is registered with a given one of the plurality of edge nodes 102 based on the current physical location or path of travel of the edge node with respect to the current physical locations of the edge nodes. Preferably each mobile device is registered to the edge node that is in closest physical proximity to that mobile device. This provides each edge nodes with a physical coverage area for data collection that is defined by the mobile devices registered to that edge node. As the mobile devices change their physical location, their registration is changed or handed off to other edge nodes based on physical proximity. Each mobile device is also configured to send heartbeat signals to the edge node to which it is registered. Therefore, the mobile devices monitor the health or operational status of the edge nodes as well as status of the communication path between the mobile devices and the edge nodes. Availability of the mobile devices, and therefore the data generation capabilities of the mobile devices, e.g., robustness, is maintained, and the mobile devices can switch registration from a first edge node to a second edge node based on a failed response to a heartbeat signal.

A separate mobile device index is maintained at each one of the plurality of edge nodes. These indexes provide for the indexing of the mobile devices themselves including the location and geographic coverage of the mobiles devices as well as the data generation capabilities of each mobile device, as opposed to indexing the data generated by the mobile devices. Therefore, indexing is distributed to the edge nodes of the system and localized, as opposed to being maintained at a root node. Each mobile device index is a spatio-temporal index containing entries for a unique set of mobile devices derived from the plurality of mobile devices in the system. Each unique set for a given edge node contains only those mobile devices registered to that edge node and associated with that that mobile device index. Therefore, each edge node maintains an index just for the mobile devices that are currently registered to it. Preferably, each mobile device index is an R-tree index, and the spatio-temporal index is a geographical coordinate system, corresponding, for example, to the terrestrial location of mobile devices and edge nodes on Earth. In one embodiment, each index entry includes meta-data for the mobile device associated with that entry. Suitable meta-data include, but are not limited to, a unique identification, e.g., alpha-numeric designation, for the associated mobile device, a current status for the associated mobile device, a current physical location of the mobile device, a predicted path of movement of the physical device, a current operational status, i.e., availability and health, of the mobile device, an identification of data generating functions of the associated mobile device and policies associated with indexing the associated mobile device and obtaining data generated by the associated mobile device. In general, each edge node maintains current location information and current operational state information for each mobile device registered to that edge node.

These policies associated with a given mobile device can be used in determining how to register, i.e., index a given mobile device with particular edge node or to limit potential registration and indexing to a specified set of edge nodes. These policies can be based on models of the availability and movement of the mobile devices. For example, if the mobility of a given mobile device is limited, e.g. by speed of travel, a model taking this mobility limitation into consideration constrains the indexing mechanism such that the mobile device is only indexed to edge nodes located within a certain physical radius. In addition, the policies can be used to constrain the access of the data generated by the mobile devices, and these policies can also use models. For example, resources associated with a given mobile device, e.g., battery life and available communication band width, can be used to model the availability of that mobile device. The policy can dictate, based on the model, when the mobile device can be used or indeed to a given edge node based on the predicted availability of the mobile device for data generation. Mobile devices that are known to be predictably unavailable can be removed from a given index during the appropriate time periods.

The system also makes use a an edge node level indexing system to provide for the transfer or hand-off of mobile devices and data collection queries. In one embodiment, each edge node maintains a peer-to-peer index. Each peer-to-peer index is an identification of mobile devices associated with each edge node and an identification of a geographic coverage area associated with each edge node. The coverage area associated with a given edge node is based on a geographic location of each mobile device currently registered to that edge node. The peer-to-peer index for a given edge node can include information for all of the other edge nodes in the system or only for a subset of the edge nodes. This subset can be constrained to a pre-defined "neighborhood" around a given edge node, i.e., only those other edge nodes with a given physical distance from the edge node containing the peer-to-peer index. The system includes at least one root node 106 that is in communication with the plurality of edge nodes 102 either directly or through one or more layers of intermediate nodes 108. The root node maintains a multi-dimensional R-tree index containing entries for the plurality of edge nodes. This multi-dimensional R-tree index is used to route data collection queries received, for example, from a plurality of applications that are in communication with the root node, to the appropriate edge nodes based on the mobile devices currently associated with those edge nodes and the availability, data collection capabilities and spatial coverage associated with those mobile devices. In one embodiment, the root node includes one or more decomposing algorithms that are used to break down data collection queries into a plurality of sub-queries that are then distributed to the appropriate edge nodes. All of indexes including the root level index and the plurality of separate edge node level indexes are updated continuously and dynamically based on the movement and availability of the mobile devices.

Figure 2:
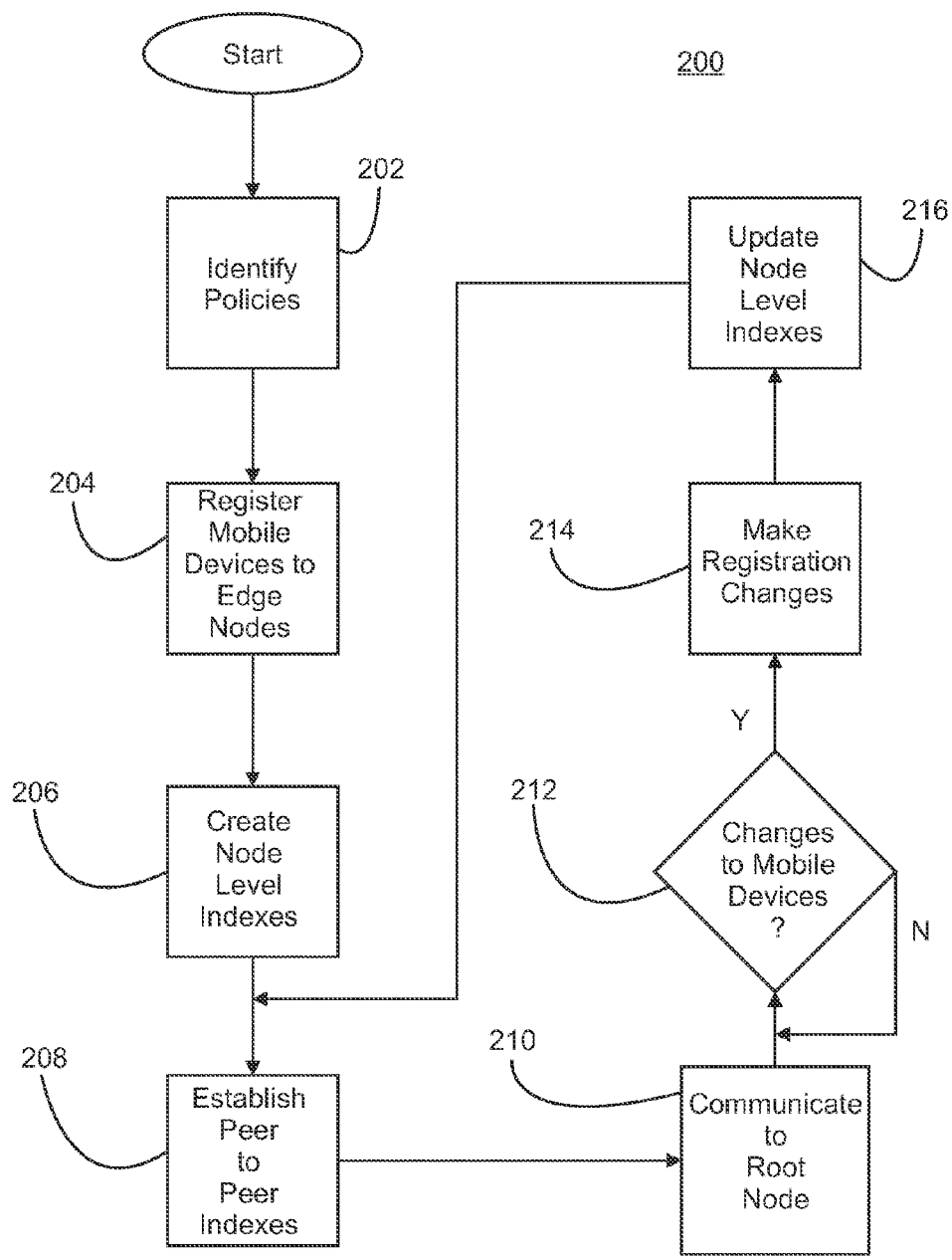
FIG. 2 is flow chart illustrating an embodiment of a method for indexing mobile devices in accordance with the present invention.

Referring to FIG. 2, exemplary embodiments in accordance with the present invention are also directed to a method for mobile device indexing 200 utilizing the mobile device indexing system. Initially, policies that are to be used in registering and indexing mobile devices with the edge nodes and obtaining data collected by the mobile devices are identified 202. Each mobile device includes computing and communication functionality to operate in the communication network. These mobile devices include computing systems, cellular telephones, audio surveillance systems, video surveillance systems and combinations thereof. The edge nodes are preferably base stations in a cellular telephone communication network. The policies are then applied to subsequent steps in the method. Each mobile device is registered with a given edge node 204. Preferably, each mobile device is registered with an edge node having a closest physical proximity to that mobile device. Each edge node communicates its current location information and current operational state information to the edge node to which it is registered. In addition, the mobile device sends a heartbeat signal to the edge node to which it is registered.

The registration at the edge node level and the communicated information from the mobile devices to the edge nodes are used to create a separate mobile device index at each one of the plurality of edge nodes in a communication network 206. Each mobile device index is a spatio-temporal index containing entries for a unique set of mobile devices containing only mobile devices registered to the edge node associated with that mobile device index. Preferably, each mobile device index is an R-tree index, and the spatio-temporal index utilizes a geographic coordinate system. In one embodiment, each index entry includes meta-data for the mobile device associated with that entry. The meta-data include, for example, a unique identification for the associated mobile device, a current operational status for the associated mobile device, an identification of data generating functions of the associated mobile device and an identification of the pre-determined policies governing access to data generated by the associated mobile device and indexing of the mobile devices.

The appropriate indexing and geographical coverage information is communicated among the edge nodes 208 such that a peer-to-peer index can be generated and maintained among the plurality of edge nodes. The peer-to-peer index is maintained at each edge node and can be the same for all edge nodes or can be specific to a given edge node. The peer-to-peer index includes an identification of mobile devices associated with each edge node and an identification of a geographic coverage area associated with each edge node. The geographic coverage area associated with each edge node is determined based on a geographic location of each mobile device currently registered to that edge node. The mobile device index information is communicated to a root node 210 so that a multi-dimensional R-tree index can be generated and maintained at the root node. This root node index includes entries for the plurality of edge nodes and is used in routing data collection queries to the appropriate edge node.

Having established the edge node level mobile device indexes, the peer-to-peer indexes and the root node index, the mobile devices are monitored for changes to the mobile devices 212 including movement of the mobile devices, availability of the mobile devices and policy compliance changes. Updating each device index is performed dynamically and continuously based on at least one of movement of each mobile device and current operational state of each mobile device. If changes are detected in the mobile devices that require modification to the registration and indexing of the mobile devices, registration of a given mobile device is moved 214. For example, registration of a given mobile device can be moved from a first edge node to a second edge node based on at least one of a response received at the given mobile device in response to the heartbeat signal, movement of the given mobile device from a first geographic region associated with the first edge node to a second geographic region associated with the second edge node and receipt at the given mobile device of an explicit command to move registration from the first edge node to the second edge node. Having moved registration of one or more mobile devices, the appropriate edge level mobile device indexes are also updated 216. The peer-to-peer and root node indexes are also update as appropriate.

Figure 3:
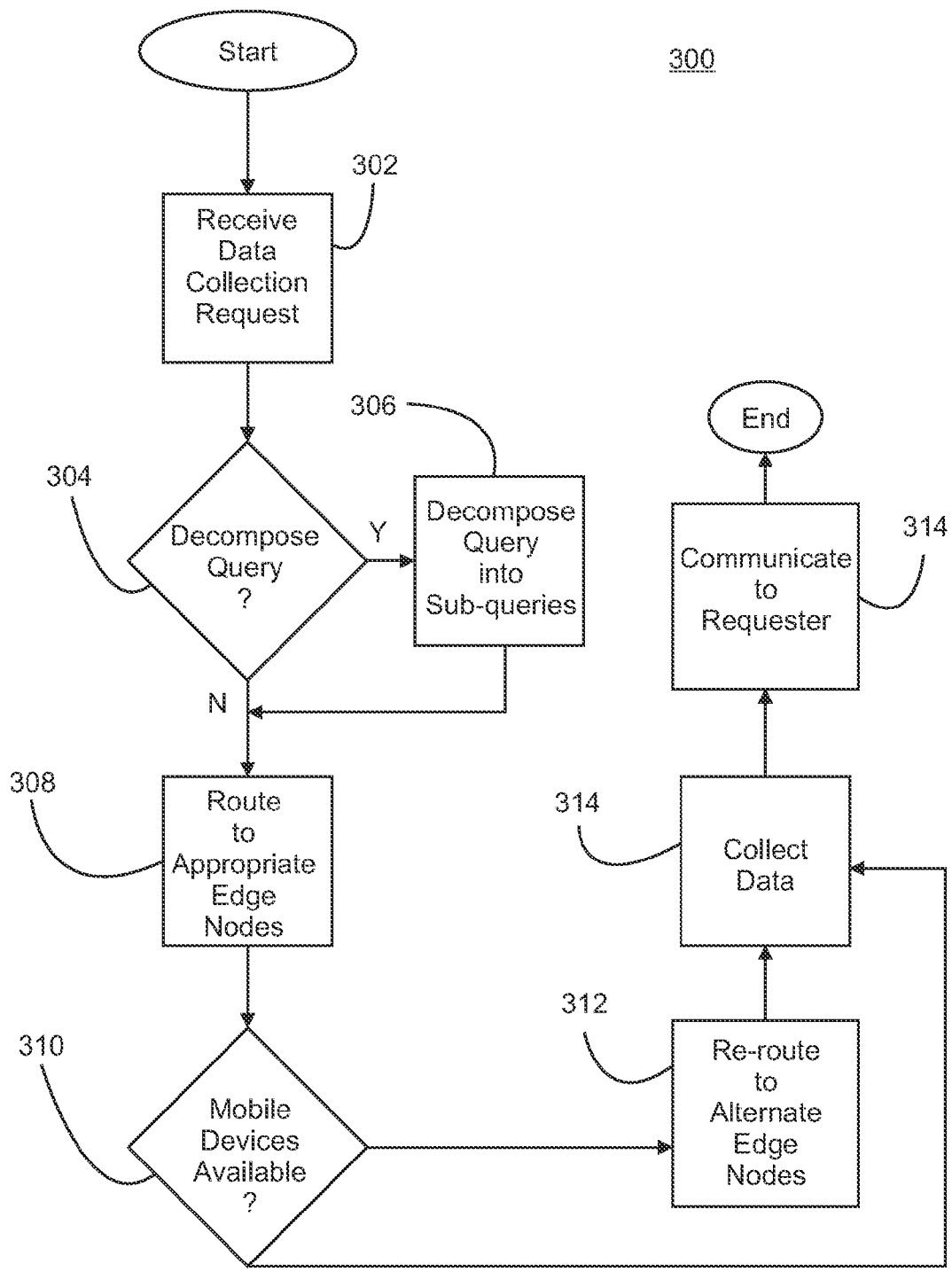
FIG. 3 is flow chart illustrating an embodiment of a method for collecting data from indexed mobile devices in accordance with the present invention.

Referring to FIG. 3, exemplary embodiments in accordance with the present invention are also directed to a method for collecting data from indexed mobile devices 300 across the indexed mobile device system. A request or query for data generated by one or more mobile devices is received from one or more applications 302. In one embodiment, the query is received at a single root node in a communication network that is in communication with the plurality of edge nodes in that communication network. A determination is made regarding whether the received query needs to be broken down into smaller requests or otherwise decomposed. 304. If the query needs to broken into a plurality of sub-queries, then the query is broken down accordingly 306, for example, using a decomposition algorithm running at the root node.

Either the original query or the plurality of generated sub-queries are then routed from the root node through the communication network to the appropriate edge nodes 308. In order to facilitate routing of data collection queries, a multi-dimensional R-tree index containing entries for the plurality of edge nodes is maintained at the root node. This multi-dimensional R-tree index is used at the root node to route the query to one or more edge nodes. A separate mobile device index is maintained at each one of a plurality of edge nodes in a communication network. Each mobile device index is a spatio-temporal index containing entries for a unique set of mobile devices containing only mobile devices registered to the edge node associated with that mobile device index, for example an R-tree spatio-temporal index using a geographic coordinate system. In one embodiment, each index entry also includes meta-data for the mobile device associated with that entry such as a unique identification for the associated mobile device, a current status for the associated mobile device, an identification of data generating functions of the associated mobile device and policies governing access to data generated by the associated mobile device.

A peer-to-peer index is maintained among the plurality of edge nodes. The peer-to-peer index contains an identification of mobile devices associated with each edge and an identification of a geographic coverage area associated with each edge node. This peer-to-peer index is used to transfer a query received at a first edge node to a second edge node. The mobile device indexes are used to route the query to one or more edge nodes and to generate the root level index.

Once the queries or sub-queries are routed to the appropriate edges nodes to which the mobile devices able to generate the desired data covering a prescribed physical location are registered, a determination is made using the mobile device indexes and policies regarding whether the appropriate mobile devices are currently available and are still associated with the edge node 310. If the mobile devices are not available or have moved registration to another edge node, the query is re-routed to an alternate edge node 312. The appropriate data are then collected from the mobile devices registered with the original edge nodes or the alternate edges 314. The collected data are then communicated back through the communication network to the requesting application 316.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for mobile device indexing and collecting data from indexed mobile devices in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A mobile device indexing system comprising:
   a plurality of edge nodes in communication with each other across a communication network;
   a plurality of mobile devices configured to communicate with the edge nodes, each mobile device comprising computing and communication functionality; and
   a separate mobile device index maintained at each one of the plurality of edge nodes, each mobile device index is a spatio-temporal index comprising entries for a unique set of mobile devices derived from the plurality of mobile devices and each unique set comprising only mobile devices registered to the edge node associated with that mobile device index;
   wherein each index entry further comprises meta-data for the mobile device associated with that entry, the meta-data comprising a unique identification for the associated mobile device, a current status for the associated mobile device, an identification of data generating functions of the associated mobile device or policies associated with obtaining data generated by the associated mobile device.

2. The system of claim 1, wherein the edge nodes comprise base stations in a cellular telephone communication network.

3. The system of claim 1, wherein each mobile device index comprises an R-tree index.

4. The system of claim 1, wherein the spatio-temporal index comprises a geographical coordinate system.

5. The system of claim 1, wherein each edge node further comprises a peer-to-peer index, each peer-to-peer index comprising an identification of mobile devices associated with the edge node and an identification of a geographic coverage area associated with the edge node based on a geographic location of each mobile device currently registered to that edge node.

6. The system of claim 1, wherein the system further comprises:
   a root node in communication with the plurality of edge nodes; and
   a multi-dimensional R-tree index comprising entries for the plurality of edge nodes, the multi-dimensional R-tree index maintained at the root node.

7. The system of claim 1, wherein the mobile devices comprise computing systems, cellular telephones, audio surveillance systems, video surveillance systems or combinations thereof.

8. The system of claim 1, wherein each mobile device is registered with a given one of the plurality of edge nodes based having a closest physical proximity to that mobile device.

9. The system of claim 1, wherein each edge node further comprises current location information and current operational state information for each mobile device registered to that edge node.

10. The system of claim 1, wherein each mobile device is configured to send heartbeat signals to the edge node to which it is registered.

* * * * *